United States Patent [19]

Landry et al.

[11] Patent Number: 5,754,602

[45] Date of Patent: May 19, 1998

[54] MULTIPLE KEY PRESS SELECTION FOR REPERTORY DIALING

[75] Inventors: Steven L. Landry, San Jose; James C. Patton, Salinas, both of Calif.

[73] Assignee: CIDCO, Incorporated, Morgan Hill, Calif.

[21] Appl. No.: 438,719

[22] Filed: May 11, 1995

[51] Int. Cl.$^6$ ................................................ H04M 1/26
[52] U.S. Cl. .......................... 379/355; 379/356; 379/368; 379/396
[58] Field of Search .................................. 379/355, 354, 379/356, 368; 341/23, 26; 364/709

[56] References Cited

U.S. PATENT DOCUMENTS

| | | | |
|---|---|---|---|
| 4,277,651 | 7/1981 | Fisher, II et al. | 379/354 |
| 4,855,740 | 8/1989 | Muramatsu et al. | 341/23 |
| 4,860,339 | 8/1989 | D'Agosto, III et al. | 379/355 |
| 4,860,349 | 8/1989 | Brown | 379/355 |
| 5,258,748 | 11/1993 | Jones | 341/23 |
| 5,311,175 | 5/1994 | Waldman | 341/23 |
| 5,509,067 | 4/1996 | Murata | 379/355 |

FOREIGN PATENT DOCUMENTS

| | | |
|---|---|---|
| 0 360 200 | 3/1990 | European Pat. Off. |
| 0 570 116 | 11/1993 | European Pat. Off. |
| 41 11300 A1 | 10/1992 | Germany |
| 2 154 393 | 9/1985 | United Kingdom |
| 2 278 756 | 12/1994 | United Kingdom |

*Primary Examiner*—Harry S. Hong
*Assistant Examiner*—Jacques M. Saint-Surin
*Attorney, Agent, or Firm*—Skjerven, Morrill, MacPherson, Franklin & Friel LLP; Alan H. MacPherson

[57] ABSTRACT

A method and system which provide for repertory dialing of a telephone. The repertory dialing system includes a repertory key, means for detecting when the repertory key is pressed and released, a memory having a first memory location and a second memory location, means for accessing or programming a first repertory number at the first memory location when the repertory key is pressed and released one time and means for accessing or programming a second repertory number at the second memory location when the repertory key is pressed and released twice. The system determines whether the memory locations are being programmed or accessed based on the timing of the presses and releases. The method includes the steps of pressing and releasing the repertory key one time to access or program a first repertory number, and pressing and releasing the repertory key two times to access or program a second repertory number. Whether the repertory numbers are accessed or programmed depends upon the timing of the pressing and releasing.

8 Claims, 4 Drawing Sheets

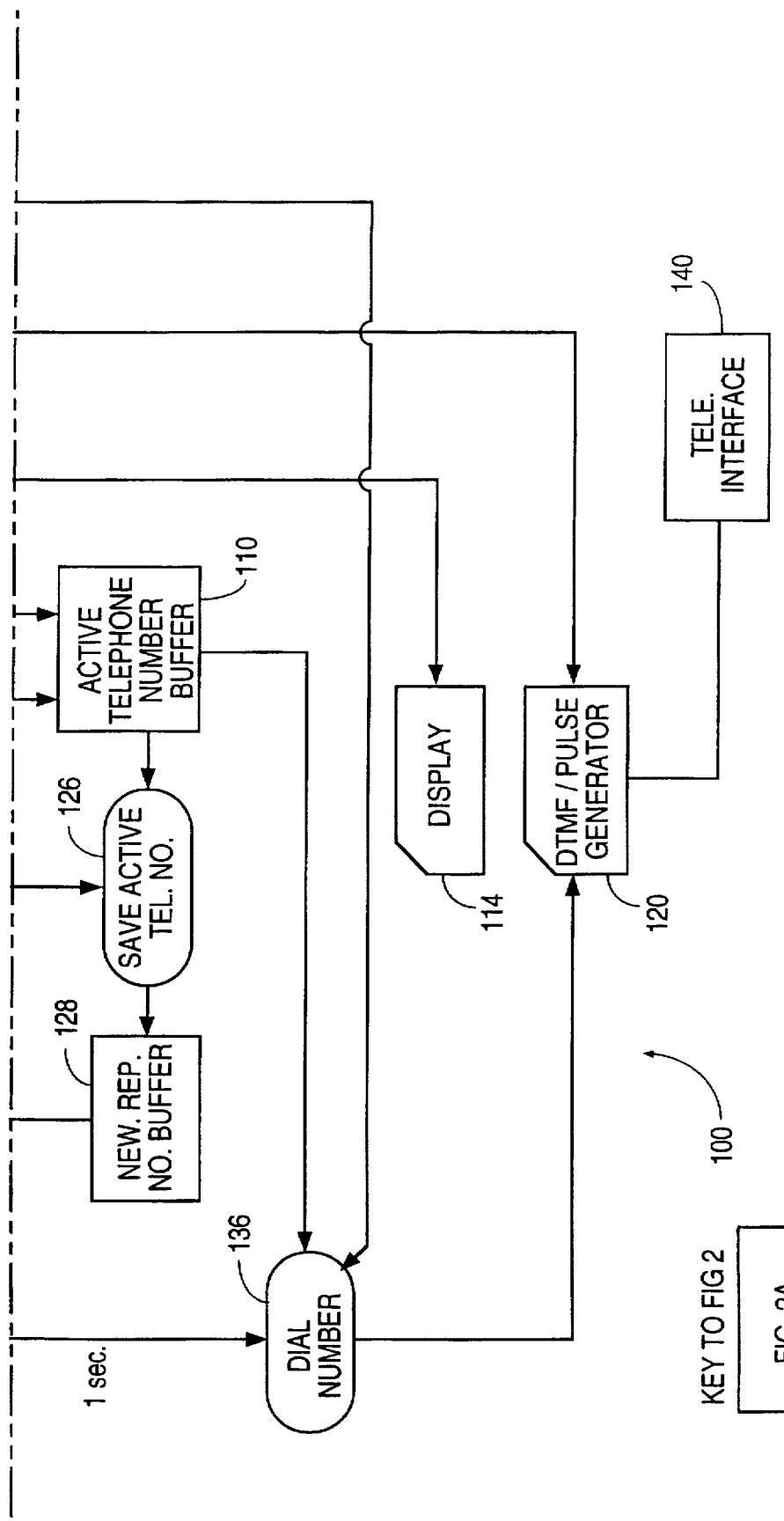

MULTIPLE KEY PRESS SELECTION FOR REPERTORY DIALING

BACKGROUND OF THE INVENTION

1. Field of the Invention

The present invention relates to a structure and method for storing and dialing telephone numbers using a telephone set.

2. Description of the Prior Art

Repertory dialing keys are a conventional feature on many modern telephone sets. A repertory dialing key is a key, separate from the standard dialing keys, which can be programmed by the user to dial a preselected telephone number in response to a single key press. Repertory keys are typically programmed with telephone numbers which are used frequently or used in an emergency. Thus, repertory keys make the use of the telephone set more convenient.

Repertory keys are typically programmed by entering the telephone number to be stored using the standard dialing keys and then depressing a separate memory key which indicates that storage of the telephone number is desired. The repertory key to be programmed is then pressed to store the telephone number in a memory. This memory is accessed when the repertory key is later pressed, thereby retrieving the stored telephone number. The retrieved number is then dialed automatically by circuitry within the telephone. In other conventional telephones, the memory key is pressed prior to entering the telephone number to be stored.

Some telephones include an additional "shift" key which allows each repertory key to store and dial two telephone numbers. When the shift key is not pressed prior to pressing the repertory key, the repertory key operates as described above to store or dial a first telephone number. If the shift key is pressed prior to pressing the repertory key, the repertory key operates to store or dial a second telephone number.

As telephones become more and more complicated with the addition of new features such as caller identification, the number of keys present on the telephone increases. To simplify the construction and usage of the telephone, it is therefore desirable to minimize the number of keys present. Similarly, it is desirable to maximize the number of telephone numbers which can be dialed using a repertory method, while minimizing the actual number of repertory keys. It would therefore be desirable to have a telephone which reduces the total number of keys and increases the total number of phone numbers which can be dialed using a repertory key.

SUMMARY OF THE INVENTION

Accordingly, the present invention provides a system having a repertory key which can cause a plurality of preselected telephone numbers to be stored or accessed by pressing and releasing the repertory key one or more times.

One embodiment of the invention includes a system having a repertory key, a circuit for detecting when the repertory key is pressed and released, a memory having a first memory location and a second memory location, a circuit for accessing a first repertory number at the first memory location when the repertory key is pressed and released once, and a circuit for accessing a second repertory number at the second memory location when the repertory key is pressed and released twice.

A variation of the above described system includes a system for accessing additional repertory numbers at additional memory locations when the repertory key is pressed and released additional times. The system can also include a circuit for generating a plurality of signals corresponding to a first telephone number when the first repertory number is accessed, and a circuit for generating a plurality of signals corresponding to a second telephone number when the second repertory number is accessed.

In another embodiment of the invention, a system includes a repertory key, a circuit for detecting when the repertory key is pressed and released, a memory having a first memory location and a second memory location, a circuit for programming a first repertory number at the first memory location when the repertory key is pressed and released once, and a circuit for programming a second repertory number at the second memory location when the repertory key is pressed and released twice.

The two systems described above can be combined, such that pressing and releasing the repertory key one time enables either the circuit for accessing the first repertory number or the circuit for programming the first repertory number, depending upon the timing of the pressing and releasing. Similarly, pressing and releasing the repertory key two times enables either the circuit for accessing the second repertory number or the circuit for programming the second repertory number, depending upon the timing of the pressing and releasing.

The invention also includes a method of operating a repertory key, including the steps of (1) pressing and releasing the repertory key one time to access a first repertory number, and (2) pressing and releasing the repertory key two times to access a second repertory number. This method can be extended to include additional steps in which pressing and releasing the repertory key additional times causes additional repertory numbers to be accessed.

The invention also includes a method of operating a repertory key comprising the steps of (1) pressing and releasing the repertory key one time to program a first repertory number into a memory, and (2) pressing and releasing the repertory key two times to program a second repertory number into a memory.

The two methods described above can be combined, such that pressing and releasing the repertory key one time causes a first repertory number to be accessed or programmed into the memory, depending upon the timing of the pressing and releasing. Similarly, pressing and releasing the repertory key two times causes a second repertory number to be accessed or programmed into the memory, depending upon the timing of the pressing and releasing.

The above described systems and methods minimize the number of keys on the telephone while increasing the number of telephone numbers which can be accessed using the repertory keys. The present invention will be more fully understood in view of the following description and drawings.

DETAILED DESCRIPTION OF THE INVENTION

Figure 1:
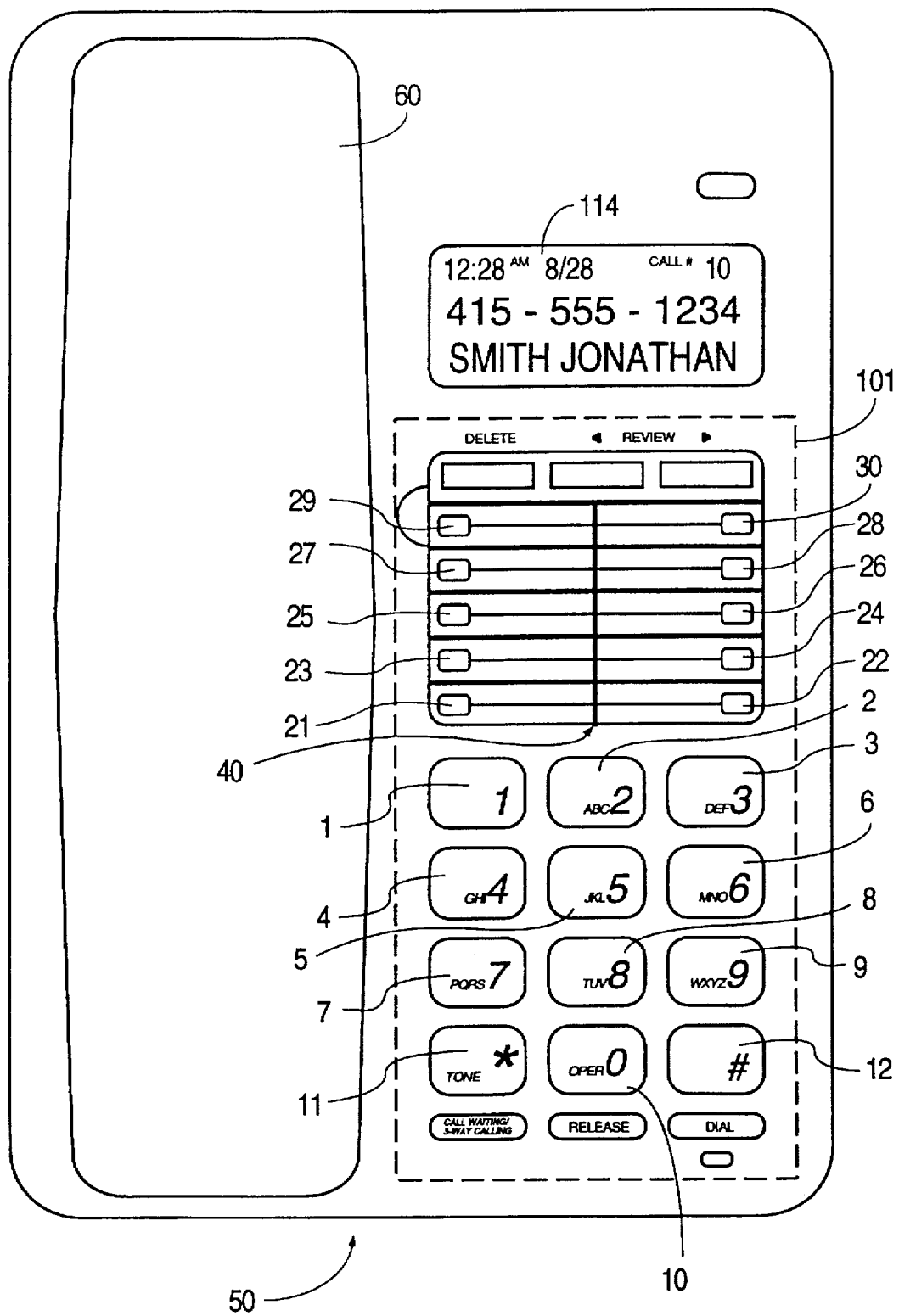
FIG. 1 is a schematic diagram illustrating the front of a telephone in accordance with one embodiment of the present invention.

FIG. 1 illustrates the front of telephone 50 in accordance with one embodiment of the invention which includes keypad 101, handset 60 and display 114. Keypad 101 includes dialing keys 1–12 and repertory keys 21–30. The operation of repertory keys 21–30 is described in accordance with one embodiment of the invention. Although ten repertory keys 21–30 are used in the described embodiment, other numbers of repertory keys are contemplated. As used herein, dialing keys are the zero through nine, * and # keys on the telephone which are conventionally used for dialing telephone numbers. A repertory key is a separate key which can be pressed to store or dial a preselected telephone number. In one embodiment, each of repertory keys 21–30 is capable of storing and dialing two telephone numbers (for a total of twenty telephone numbers). The telephone numbers corresponding to repertory keys 21–30 can be written on label 40 next to repertory keys 21–30. Telephone 50 can also include additional keys, as illustrated; however, these additional keys do not directly pertain to the present invention.

In general, telephone 50 operates as follows. To dial a first repertory telephone number, a repertory key, such as repertory key 21 is pressed and released within a predetermined first time period (e.g., four seconds). When repertory key 21 is pressed, the first repertory number is retrieved from a memory (not shown) and displayed on display 114. After a second predetermined time period (e.g., one second from the time that repertory key 21 is released) elapses without repertory key 21 being re-pressed, the first repertory telephone number is dialed. Although the operation of repertory key 21 is specifically described, this description applies equally to the operation of repertory keys 22–30.

To dial a second repertory telephone number using repertory key 21, repertory key 21 is pressed and released within the first time period (e.g., four seconds). When repertory key 21 is pressed, the first repertory number is retrieved from a memory (not shown) and displayed on display 114. Repertory key 21 is then pressed a second time within a second time period (e.g., one second) after key 21 is released. When repertory key 21 is pressed for the second time, the second repertory number is retrieved from a memory (not shown) and displayed on display 114. Repertory key 21 is then released within a third time period (e.g., within four seconds) after repertory key 21 is pressed the second time. When a fourth predetermined time period (e.g., one second) passes without repertory key 21 being re-pressed, the second repertory telephone number is dialed.

To program the first repertory telephone number, the first repertory number is entered by pressing the appropriate dialing keys 1–12 when telephone 50 is in either an on-hook or off-hook condition. This causes the first repertory telephone number to be shown on display 114. The user then presses and holds repertory key 21. When repertory key 21 is pressed, the repertory number (if any) previously associated with a single press of repertory key 21 is retrieved from a first memory location in a memory (not shown) and displayed on display 114. Repertory key 21 is held in a depressed state for the first time period (e.g., four seconds). At the end of this first time period, the first repertory number is written to the first memory location, thereby overwriting the repertory number previously stored (if any) in the first memory location. The first repertory number is then displayed on display 114. The displayed first repertory number flashes on and off on display 114 until repertory key 21 is released.

To program the second repertory number for use in connection with repertory key 21, the second repertory number is entered by pressing the appropriate dialing keys 1–12 when telephone 50 is in either an on-hook or off-hook condition. At this point, the second repertory telephone number is shown on display 114. The user then presses and releases repertory key 21 before the first time period expires (e.g., within four seconds). When repertory key 21 is pressed, the repertory number (if any) previously associated with a single press of repertory key 21 is retrieved from the first memory location and displayed on display 114. Repertory key 21 is then pressed a second time within a second time period (e.g., one second) after key 21 is released. When repertory key 21 is pressed for the second time, a repertory number (if any) previously associated with a double press of repertory key 21 is retrieved from a second memory location and displayed on display 114. Repertory key 21 is held in a depressed state for a third time period (e.g., four seconds from the time that key 21 was depressed for the second time). At the end of this third time period, the second repertory number is written to the second memory location, thereby overwriting the repertory number previously stored (if any) in the second memory location. The second repertory number is then displayed on display 114. The displayed second repertory number flashes on and off on display 114 until repertory key 21 is released.

Figure 2A:
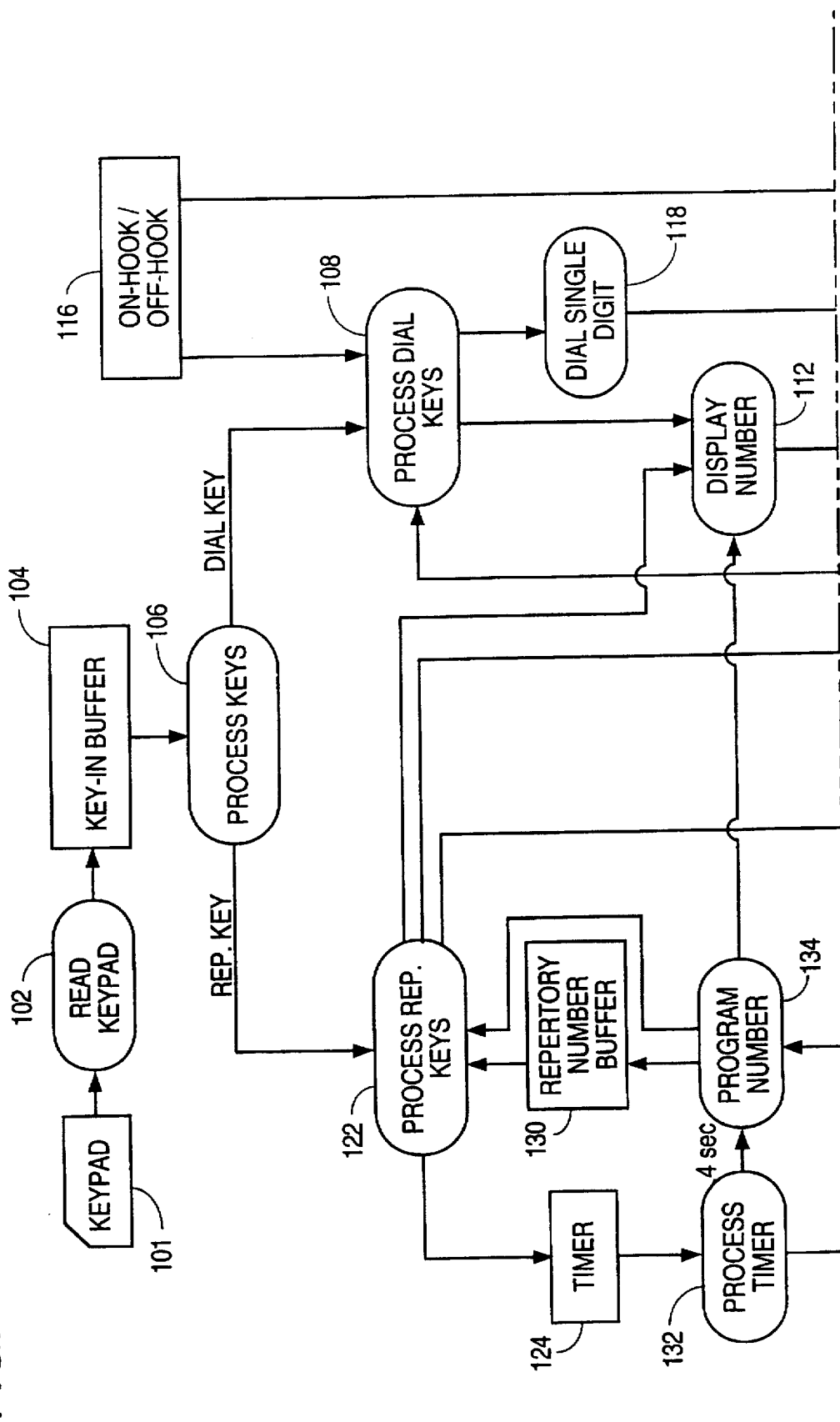
FIG. 2, which consists of FIGS. 2A and 2B, is a schematic diagram illustrating circuitry and software used to implement a repertory key in accordance with the invention.

FIG. 2, which consists of FIGS. 2A and 2B, is a schematic diagram illustrating the operation of dialing keys 1–12 and repertory keys 21–30 in greater detail. FIG. 2 shows a repertory dialing system 100 which includes blocks which are illustrated as rectangles and ovals. In general, the blocks shown in rectangles represent hardware or memory, and the blocks shown in ovals represent software. The software is implemented by a microprocessor as described in more detail below.

Keypad 101 includes both repertory and dialing keys. Read Keypad software 102 monitors keypad 101 and detects when a key (either repertory or dialing) is depressed or released. Upon detecting a keypad event, Read Keypad software 102 writes a data word to key-in buffer 104. This data word indicates which key was involved in the keypad event, whether the involved key was a repertory key or a dialing key and whether the involved key was pressed or released.

Process Keys software 106 monitors key-in buffer 104 and detects when a new data word is received. Process Keys software 106 analyzes the data word to determine whether the keypad event involved a dialing key or a repertory key. If the keypad event involved a dialing key, the data word is passed to Process Dial Keys software 108, where processing continue.

Upon receiving the data word, Process Dial Keys software 108 retrieves an active telephone number stored in active telephone number buffer 110. Active telephone number buffer 110 is an 8-byte buffer capable of storing a 16-digit telephone number. In other embodiments, active telephone number buffer 110 can store a different number of digits (e.g., 40). Process Dial Keys software 108 reads the data word and determines which dial key was pressed. Process Dial Keys software 108 then shifts the number associated with the pressed key into the active telephone number at the least significant digit position. For example, if the active telephone number retrieved from buffer 110 is "555123" and the "4" key is pressed, Process Dial Keys software 108 updates the active telephone number to be "5551234". The updated active telephone number is written to active telephone number buffer 110. If the old active telephone number includes a digit in the most significant digit position, this most significant digit is shifted out of the active telephone number and is lost.

After the updated active telephone number is stored in buffer 110, Process Dial Keys software 108 instructs Display Number software 112 to retrieve the updated active telephone number from active telephone number buffer 110. Display Number software 112 transmits the updated active telephone number to display 114, where the user can see the updated active telephone number. Display 114 is, for example, an LCD display located on the face of the telephone.

In addition, Process Dial Keys software 108 receives a signal from monitoring block 116 which indicates whether telephone 50 is in an on-hook or off-hook condition. If the telephone is in an off-hook condition, processing continues to Dial Single Digit software 118. Dial Single Digit software 118 causes DTMF/pulse generator 120 to generate a signal representative of the dial key depressed on keypad 101. The generated signal is transmitted to telephone interface 140. In the foregoing example, DTMF/pulse generator 120 would generate a signal representative of the number "4" if the telephone was in an off-hook condition. Dial Single Digit software 118 causes DTMF/pulse generator 120 to generate a signal representative of the depressed dial key until the dial key is released.

If the telephone is in an on-hook condition, Process Dial Keys software 108 does not access Dial Single Digit software 118. As a result, no signal is generated by DTMF/pulse generator 120.

To program a repertory number, the desired repertory number is first entered using dialing keys 112 of keypad 101 while telephone 50 is in either an on-hook or off-hook condition. This places the desired repertory number in active telephone number buffer 110 and displays the desired repertory number on display 114.

Returning to Process Keys software 106, if the keypad event involves a repertory key, the data word is passed to Process Repertory Keys software 122, where processing continues. If Process Repertory Keys software 122 detects that a repertory key was depressed, Process Repertory Keys software 122 loads countdown timer 124 with a value which will cause timer 124 to expire after a first time period (e.g., in four seconds). Process Repertory Keys software 122 also accesses Save Active Telephone Number software 126. Save Active Telephone Number software 126 retrieves the telephone number currently stored in active telephone number buffer 110 and stores this telephone number in new repertory number buffer 128. As described in more detail below, the telephone number stored in new repertory number buffer 128 may or may not be stored as a repertory number corresponding to the depressed repertory key, depending on subsequent actions.

After the current active telephone number is written to new repertory number buffer 128, Process Repertory Keys software 122 accesses repertory number buffer 130. Repertory number buffer 130 stores the repertory numbers corresponding to the depressed repertory key. In the embodiment described each of repertory keys 21-30 has a first repertory number which is accessed by a single press of the corresponding repertory key and a second repertory number which is accessed by a double press of the corresponding repertory key. Repertory number buffer 130 stores the first and second repertory numbers for each of repertory keys 21-30. Thus, Process Repertory Keys software 122 retrieves the first repertory number corresponding to the depressed repertory key from repertory number buffer 130. Process Repertory Keys software 122 writes this first repertory number to active telephone number buffer 110. Process Repertory Keys software 122 then accesses Display Number software 112, which causes the first repertory number stored in active telephone number block 110 to be displayed on display 114.

Process Timer software 132 monitors countdown timer 124 to determine whether this timer 124 expires. If the four second count programmed into timer 124 expires without being reset by another keypad event, Process Timer software 132 causes processing to continue to Program Number software 134. Program Number software 134 causes the number stored in new repertory number buffer 128 to be written to repertory number buffer 130, thereby overwriting the first repertory number previously stored in buffer 130. Program Number software 134 also causes Process Repertory Keys software 122 to write the updated first repertory number to active telephone number buffer 110 and causes Display Number software 112 to display the updated first repertory number on display 114.

Thus, the following steps are performed to program a first repertory number: (1) In an on-hook or off-hook condition, the desired repertory number is entered using dialing keys 1-12 of keypad 101, and (2) repertory key 21 is pressed and held for a first predetermined time period (e.g., four seconds).

If depressed repertory key 21 is released before timer 124 completes its four second countdown, this release information is provided to Process Repertory Keys software 122 via keypad 101, Read Keypad software 102, key-in buffer 104, and Process Key software 106 in the manner previously described. Upon detecting the release of repertory key 21, Process Repertory Keys software 122 loads timer 124 with a count corresponding to a predetermined second time period (e.g., one second). If the second time period elapses before repertory key 21 is pressed again, Process Timer software 132 causes processing to proceed to Dial Number software 136. Dial Number software 136 retrieves the telephone number currently stored in active telephone number buffer 110 (i.e., the first repertory number). Dial Number software 136 is also coupled to hook switch 116. Dial Number software 136 thereby receives data which indicates whether telephone 50 is in an on-hook or off-hook condition. If telephone 50 is in an off-hook condition, Dial Number software 136 causes DTMF/pulse generator circuit 120 to generate signals corresponding to this telephone number. These signals are transmitted to telephone interface 140.

Thus, to dial a first repertory number stored in repertory number buffer 130, the following steps are performed: (1) repertory key 21 is pressed when telephone 50 is in an off-hook condition, (2) repertory key 21 is released within a first time period (e.g., four seconds) of the press, and (3) repertory key 21 is not pressed again for a second time period (e.g., one second) after repertory key 21 is released.

If repertory key 21 is depressed for a second time before the second time period elapses, Process Repertory Keys software 122 detects this event in the manner previously described and loads timer 124 with a count corresponding to a third time period (e.g., four seconds). Process Repertory Keys software 122 also retrieves the second repertory number (if any) corresponding to the depressed repertory key from repertory number memory 130 and provides this second repertory number to active telephone number buffer 110. Process Repertory Keys software 122 then instructs Display Number software 112 to display the second repertory number stored in active telephone number block 110 on display 114.

If the third time period (e.g., four seconds) elapses without repertory key 21 being released, Process Timer software 132 detects the expiration of timer 124 and causes processing to continue with Program Number software 134. Program Number software 134 writes the number stored in new repertory number buffer 128 (i.e., the number originally entered using the dialing keys of keypad 101) into repertory number buffer 130 at the location reserved for the second repertory number of the depressed repertory key.

If repertory key 21 is released before the third time period (e.g., four seconds) elapses, Process Repertory Keys software 122 detects this event in the manner previously described and loads timer 124 with a count corresponding to a predetermined fourth time period (e.g., one second). If this fourth time period elapses before repertory key 21 is depressed again, Process Timer software 132 detects the expiration of timer 124 and causes Dial Number software 136 to access the second repertory number stored in active telephone number register 110. If hook switch 116 is in an off-hook condition, Dial Number software 136 causes this second repertory number to be transmitted to DTMF/pulse generator 120, which generates signals representative of the second repertory number. These signals are transmitted to telephone interface 140.

Figure 3:
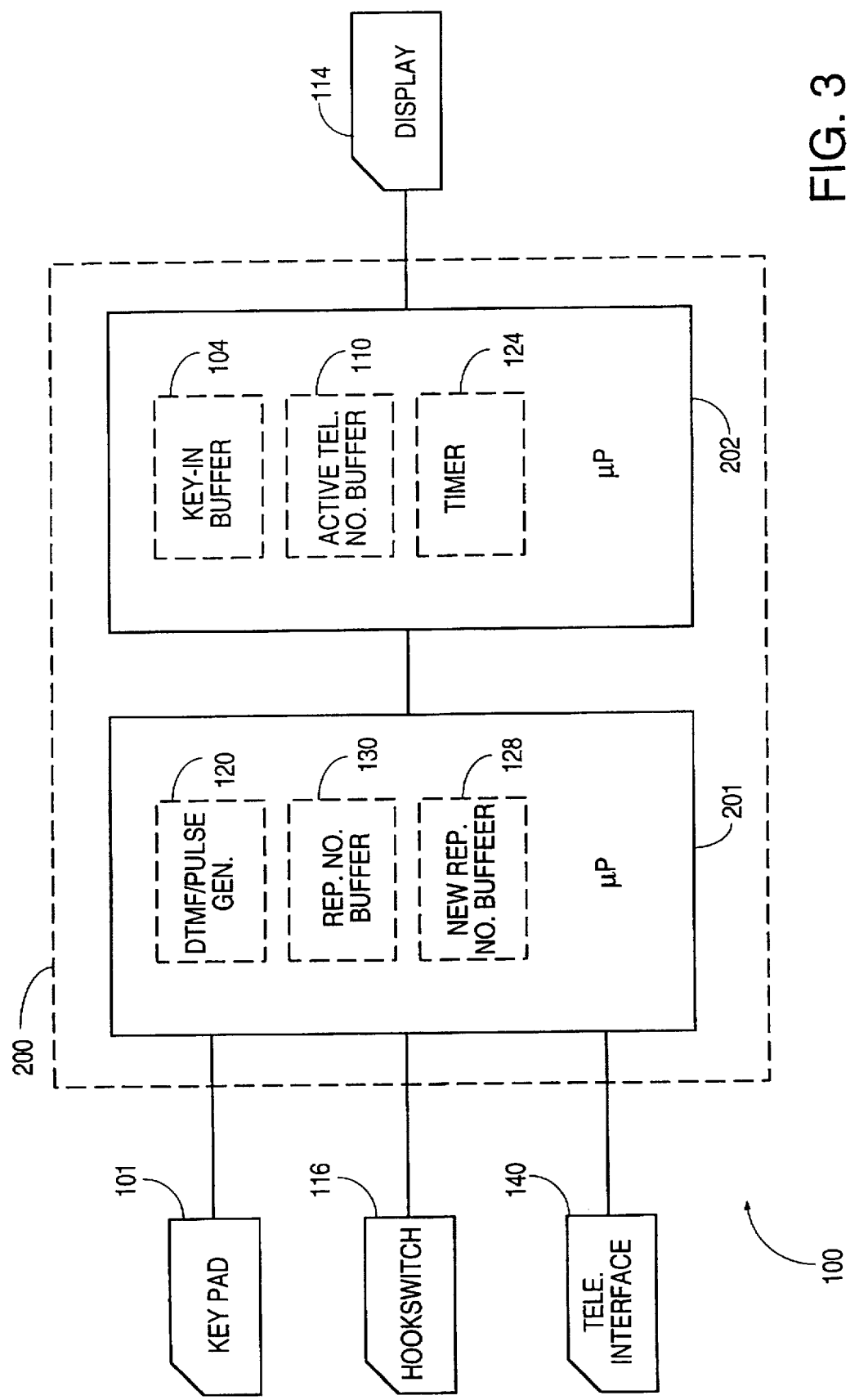
FIG. 3 is a block diagram of a hardware implementation of a repertory dialing circuit.

FIG. 3 is a block diagram of a hardware implementation of repertory dialing system 100 (FIG. 2). Repertory dialing system 100 includes a microprocessor circuit 200 which includes two microprocessors 201 and 202. Microprocessor 201 includes circuitry which is used to implement DTMF/ pulse generator 120, repertory number buffer 130, and new repertory number buffer 128. Microprocessor 201 is coupled to keypad 101, hook switch 116, telephone interface 140 and microprocessor 202. Microprocessor 201 is programmed to implement Read Keypad software 102. In one embodiment, microprocessor 201 is a conventional general purpose microcontroller, which is available from suppliers such as Hitachi, Motorola or Samsung.

Microprocessor 202 is connected between microprocessor 201 and display 114. Microprocessor 202 includes circuitry which is used to implement active telephone number buffer 110, timer 124 and key-in buffer 104. Microprocessor 202 is programmed to implement Process Keys software 106, Process Dial Keys software 108, Display Number software 112, Dial Single Digit software 118, Process Repertory Keys software 122, Save Active Telephone Number software 126, Process Timer software 132, Program Number software 134, and Dial Number software 136. Microprocessor 202 is a conventional general purpose microcontroller, available from suppliers such as Hitachi, Motorola, NEC, Samsung, Seiko Epson and Texas Instruments. Although microprocessor circuit 200 is shown as using two microprocessors 201 and 202, microprocessor circuit 200 can be modified to include other numbers (e.g., 1, 3, etc.) of microprocessors.

The previously described embodiment of the invention can be extended such that each repertory key can dial more than two telephone numbers. For example, the software can be reprogrammed such that three presses of a repertory key will result in a third repertory number being dialed or programmed.

While the present invention has been described in connection with a particular embodiment, it is understood that the invention is not limited to the embodiment disclosed, but is capable of various modifications which would be apparent to one of ordinary skill in the art. For example, the invention is not limited to use in connection with a telephone, but can be expanded for use with other devices, including, but not limited to, stereo equipment and computers. Thus, the present invention is limited only by the following claims.

What is claimed is:

1. A system comprising:
   a plurality of dialing keys for entering a new repertory number;
   a repertory key;
   means for detecting when the repertory key is pressed and released;
   a memory having a first memory location for storing a first repertory number and a second memory location for storing a second repertory number;
   means for storing the new repertory number at the first memory location when the repertory key is pressed and held for a first predetermined time period; and
   means for storing the new repertory number at the second memory location when the repertory key is pressed and released within the first predetermined time period, is pressed a second time within a second predetermined time period after the repertory key is released and is continuously held for a third predetermined time period after the repertory key is pressed the second time.

2. The system of claim 1, further comprising a display, wherein the display displays the new repertory number entered by the dialing keys, wherein the display displays the first repertory number when the repertory key is pressed the first time, wherein the display displays the second repertory number when the repertory key is pressed the second time, and wherein the display displays the new repertory number when the new repertory number is stored in the first memory location or the second memory location.

3. The system of claim 1, further comprising:
   means for dialing the first repertory number if the repertory key is released a first time before the first time period expires and the repertory key is not pressed a second time within a fourth time period after the repertory key is released the first time; and
   means for dialing the second repertory number if the repertory key is released a first time before the first time period expires, the repertory key is pressed a second time within the fourth time period after the repertory key is released the first time, the repertory key released a second time before a fifth time period expires, and the repertory key is not pressed a third time within a sixth time period after the repertory key is released the second time.

4. The system of claim 1, wherein the memory further has a third memory location, said system further comprising:
   means for storing the new repertory number at the third memory location when the repertory key is pressed and released a first time within the first predetermined time period, is pressed a second time within a second predetermined time period after the repertory key is released the first time, is released within the third predetermined time period after the repertory key is pressed the second time, is pressed a third time within a fourth predetermined time period after the repertory key is released the second time, and is continuously held for a fifth predetermined time period after the repertory key is pressed the third time.

5. A repertory dialing circuit comprising:
   a keypad having dialing keys and a repertory key;
   a first key processing circuit coupled to the keypad, wherein the first key processing circuit identifies depressed and released keys on the keypad;
   a dialing keys processing circuit coupled to the first key processing circuit, wherein the dialing keys processing circuit updates an active telephone number when a dialing key is pressed;
   a first memory coupled to the dialing keys processing circuit, wherein the first memory stores the active telephone number;

a second memory coupled to the first memory;

a third memory coupled to the second memory, wherein the third memory stores a first repertory number and a second repertory number corresponding to the repertory key;

a repertory keys processing circuit coupled to the first key processing circuit, the first memory and the third memory, wherein the repertory keys processing circuit causes the active telephone number to be written from the first memory to the second memory when the repertory key is pressed;

a timer coupled to the repertory keys processing circuit, the second memory and the third memory, wherein the timer is loadable by the repertory keys processing circuit with a first count value when the repertory key is pressed and a second count value when the repertory key is released, wherein said timer causes the active telephone number to be written from the second memory to the third memory when the timer counts to the first count value; and a signal generator coupled to the timer, wherein the timer causes the signal generator to generate a signal representative of one of the first and second repertory numbers when the timer counts to the second count value.

6. A method of operating a telephone set having a plurality of dialing keys and a repertory key, the method comprising the steps of:

entering a new repertory number by pressing a plurality of the dialing keys;

displaying the new repertory number; and then pressing the repertory key a first time;

retrieving a first repertory number from a first memory location when the repertory key is pressed the first time;

displaying the first repertory number retrieved from the first memory location when the repertory key is pressed the first time;

storing the new repertory number in the first memory location if the repertory key is continuously held in a pressed state for a first time period after the repertory key is pressed the first time;

displaying the new repertory number when the new repertory number is stored in the first memory location;

retrieving a second repertory number from a second memory location if the repertory key is released a first time before the first time period expires and is pressed a second time before a second time period expires;

displaying the second repertory number retrieved from the second memory location when the repertory key is pressed the second time;

storing the new repertory number in the second memory location if the repertory key is continuously held in a pressed state for a third time period after the repertory key is pressed the second time; and displaying the new repertory number when the new repertory number is stored in the second memory location.

7. The method of claim 6, further comprising the steps of:

dialing the first repertory number if the repertory key is released a first time before the first time period expires and the repertory key is not pressed a second time within a fourth time period after the repertory key is released the first time; and dialing the second repertory number if the repertory key is released a first time before the first time period expires, the repertory key is pressed a second time within the fourth time period after the repertory key is released the first time, the repertory key released a second time before a fifth time period expires, and the repertory key is not pressed a third time within a sixth time period after the repertory key is released the second time.

8. The method of claim 6, wherein the first time period is equal to the third time period.

* * * * *